(No Model.)
E. A. ASHCROFT.
METHOD OF PREPARING ZINC ORES AND ZINKIFEROUS ORES FOR SMELTING.
No. 595,513. Patented Dec. 14, 1897.
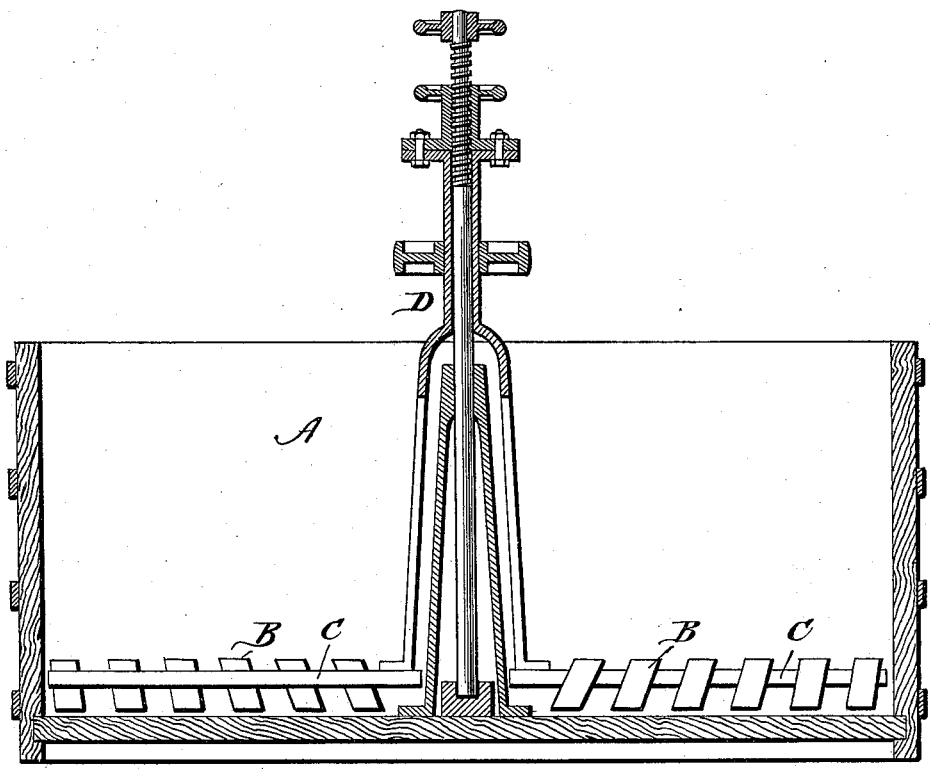
WITNESSES:
INVENTOR
E. A. Ashcroft.
BY
ATTORNEYS.

UNITED STATES PATENT OFFICE.

EDGAR A. ASHCROFT, OF GRAYS, ENGLAND.

METHOD OF PREPARING ZINC ORES AND ZINKIFEROUS ORES FOR SMELTING.

SPECIFICATION forming part of Letters Patent No. 595,513, dated December 14, 1897.

Application filed March 20, 1896. Serial No. 584,057. (No specimens.)

*To all whom it may concern:*

Be it known that I, EDGAR ARTHUR ASH-CROFT, electrical engineer, a subject of the Queen of Great Britain, residing at Willyama Works, Grays, in the county of Essex, England, have invented a Method of Preparing Zinc Ores and Zinkiferous Lead Ores for Smelting, of which the following is a specification.

This invention relates to the method of preparing zinc ores and zinkiferous lead ores for smelting which forms the subject of another application for Letters Patent of the United States of America, filed the 27th day of December, 1895, Serial No. 573,544.

This method consists in dissolving out the zinc from the ore and at the same time precipitating ferric hydrate in the residue, in order that the hydrate shall serve as a flux in the subsequent operation of smelting the residue alone or with other suitable ores for extraction of silver, lead, and other valuable constituents. The ferric hydrate being obtained by chemical precipitation is in a very finely-divided state and is disseminated through the residue in intimate contact with the particles of the ore. It is therefore in an eminently-suitable condition to produce the desired fluxing action in the smelting operation, which is consequently rendered much more rapid and economical than when iron in any other form is used as a flux, while the smelting capacity of the furnace is increased by the fact that the fluxing agent is in a high state of purity.

The present improvement consists in effecting this precipitation of ferric hydrate in the residue by leaching the ore with an aqueous solution of ferric sulfate.

In carrying my improvement into effect the ore, if it contain sulfid, is first subjected to a preliminary oxidation to convert the zinc sulfid as far as possible to neutral or basic zinc sulfate and zinc oxid. This is most conveniently effected by roasting, in which process the lead sulfid also undergoes oxidation more or less completely. The ore is ground, preferably to extreme fineness, (either before or after roasting, if roasting be used,) and is then leached with a hot aqueous solution of ferric sulfate with or without the presence of a zinc salt.

A hot solution of ferric sulfate is used for two reasons: First, the reaction between the ferric sulfate and the ore proceeds more readily when the solution of the ferric sulfate is hot, and consequently a larger quantity of ferric hydrate is formed, and, second, the formation of colloidal ferric hydrate is prevented if the solution is hot, and consequently the ferric hydrate is precipitated (which is the object of the invention) instead of remaining to a large extent dissolved and disseminated through the solution in an unconglomerated form, as is the case when a cold solution is used.

The reaction proceeding may be represented by the equation $$3(ZnO) + Fe_2(SO_4)_3 + 3(H_2O) = 3(ZnSO_4) + Fe_2(OH)_6.$$

It will be seen that the reaction whereby zinc is dissolved and iron precipitated as ferric hydrate depends on any sulfur present in combination with zinc being in an oxidized form, inasmuch as the effect of the action of ferric sulfate upon a sulfid would be to leave the iron in solution, whereas the object which I have in view is to throw down the iron as ferric hydrate.

The leaching operation may be performed in a vat such as that illustrated in vertical section in the accompanying drawing, forming part of this specification, the vat A being provided with rotary stirrers B, carried by arms C on a vertical shaft D, mounted to rotate in the vat A; or other means of continually agitating the contents throughout the operation may be employed. The reaction is complete when the whole of the ferric salt is precipitated as ferric hydrate, the relative proportion of the reagents being so calculated that when the reaction of the ferric salt is complete all or nearly all the zinc will have been dissolved out of the ore. The zinc solution is then separated from the residue by settling and decantation or filter-pressing, leaving the ferric hydrate disseminated throughout the residue, which contains the lead (in the form of sulfates, oxid, &c.) and the greater part of the silver, together with the gangue. The residue, when dried, is then fit for smelting without the addition of any other fluxing agent than the ferric hydrate contained in it; but limestone may be added to the charge to produce a free-running slag. Furthermore, the residue may be improved by the addition of quicklime or by being heated to a dull red heat to abstract and drive off the water of hydration from the ferric hydrate, which will then act as a binding agent and by agglomerating the fine particles of residue into lumps prevent waste in smelting.

I claim—

1. The herein-described improvement in the method of preparing zinc ores and zinkiferous lead ores for smelting, which consists in leaching the finely-ground ore with a hot solution of ferric sulfate thereby dissolving out the zinc and precipitating the iron as ferric hydrate in the residue to serve as a flux in the smelting operation as specified.

2. The herein-described improvement in the method of preparing zinc ores and zinkiferous lead ores for smelting, which consists in first converting the zinc sulfid present in the ore to neutral or basic zinc sulfate and zinc oxid, grinding the ore, and then leaching the finely-ground ore with a hot solution of ferric sulfate to dissolve out the zinc and precipitate the iron as ferric hydrate in the residue to serve as a flux in the subsequent smelting operation as specified.

3. The herein-described improvement in the method of preparing zinc ores and zinkiferous lead ores for smelting, which consists in first roasting the ore to convert the zinc sulfid present in the ore to neutral or basic zinc sulfate and zinc oxid, grinding the ore, and then leaching the finely-ground ore with a hot solution of ferric sulfate to dissolve out the zinc and precipitate the whole of the iron as ferric hydrate in the residue to serve as a flux in the subsequent smelting operation as specified.

4. The herein-described improvement in the method of preparing zinc ores and zinkiferous lead ores for smelting, which consists in leaching the finely-ground ore with a hot solution of ferric sulfate and subjecting the mixture to continuous agitation during the leaching process, thereby dissolving out the zinc and precipitating the iron as ferric hydrate in the residue to serve as a flux in the smelting operation, substantially as specified.

5. The herein-described improvement in the method of preparing zinc ores and zinkiferous lead ores for smelting, which consists in first converting the zinc sulfid present in the ore to neutral or basic zinc sulfate and zinc oxid, then leaching the finely-ground ore with a hot solution of ferric sulfate and subjecting the mixture to agitation during the leaching process, thereby dissolving out the zinc and precipitating the whole of the iron as ferric hydrate and then separating the zinc solution from the mixture leaving the ferric hydrate disseminated through the residue to serve as a flux in the smelting operation, substantially as specified.

EDGAR A. ASHCROFT.

Witnesses:
T. DUNDAS PILLAUS,
WM. CLARK.